(12) United States Patent
Gaudron

(10) Patent No.: US 6,435,789 B2
(45) Date of Patent: *Aug. 20, 2002

(54) SELF DRILLING SWIVEL TOGGLE ANCHOR

(75) Inventor: Paul Gaudron, Stamford, CT (US)

(73) Assignee: Powers Fasteners, New Rochelle, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,001

(22) Filed: Dec. 21, 1999

(51) Int. Cl.⁷ .................................. F16B 21/00
(52) U.S. Cl. ..................... 411/344; 411/340; 411/29
(58) Field of Search ................ 411/340–346, 29, 411/30, 387.5

(56) References Cited

U.S. PATENT DOCUMENTS

| | | | |
|---|---|---|---|
| 2,908,196 A | | 10/1959 | Aptelzweig |
| 3,127,807 A | * | 4/1964 | Modrey |
| 3,248,994 A | * | 5/1966 | Mortensen |
| 3,385,156 A | | 5/1968 | Polos |
| 3,707,898 A | * | 1/1973 | Holly |
| 3,927,597 A | | 12/1975 | Stults et al. |
| 4,285,264 A | | 8/1981 | Einhorn |
| 4,407,462 A | | 10/1983 | Tajima et al. |
| 4,822,226 A | | 4/1989 | Kennedy |
| 5,067,864 A | * | 11/1991 | Dewey |
| 5,221,169 A | * | 6/1993 | McSherry |
| 5,322,401 A | * | 6/1994 | Vernet .................. 411/344 |
| 5,876,169 A | * | 3/1999 | Wrigley |
| 6,250,865 B1 | | 6/2001 | McSherry |

FOREIGN PATENT DOCUMENTS

| | | | |
|---|---|---|---|
| DE | | 115373 | 10/1899 |
| DE | | 2249772 | 9/1973 |
| DE | | 2549868 | 5/1976 |
| WO | | WO 99/05419 | * 2/1999 |

OTHER PUBLICATIONS

"E–Z Toggle" box. TWI Buildex Copyright 1990, Illinois Tool Works, Inc., Photocopy of all side of the box, photographs and photocopies of contents.

* cited by examiner

Primary Examiner—Flemming Saether
(74) Attorney, Agent, or Firm—Morgan, Lewis & Bockius LLP

(57) ABSTRACT

A self drilling toggle anchor including an anchor member having a head portion at a proximal end, a locking portion at a distal end and a central portion for securely anchoring hardware to a wall, where the central portion defines and borders a channel between the head portion and locking portion. The toggle anchor also includes a drilling member positioned at a distal end of the toggle anchor for drilling through the wall and a toggle member. The toggle member includes a body disposed within the channel of the anchor member, a fitting portion disposed between the body and the drilling member, and upper and lower pairs of shoulders supporting the body within the channel. The body is slidably mounted to the anchor member within the channel and the fitting portion is adapted to releasably engage the locking portion allowing the toggle member to be movable from a releasably locked and fixed first position parallel with a longitudinal axis of the channel to a second position orthogonal to the channel.

12 Claims, 13 Drawing Sheets

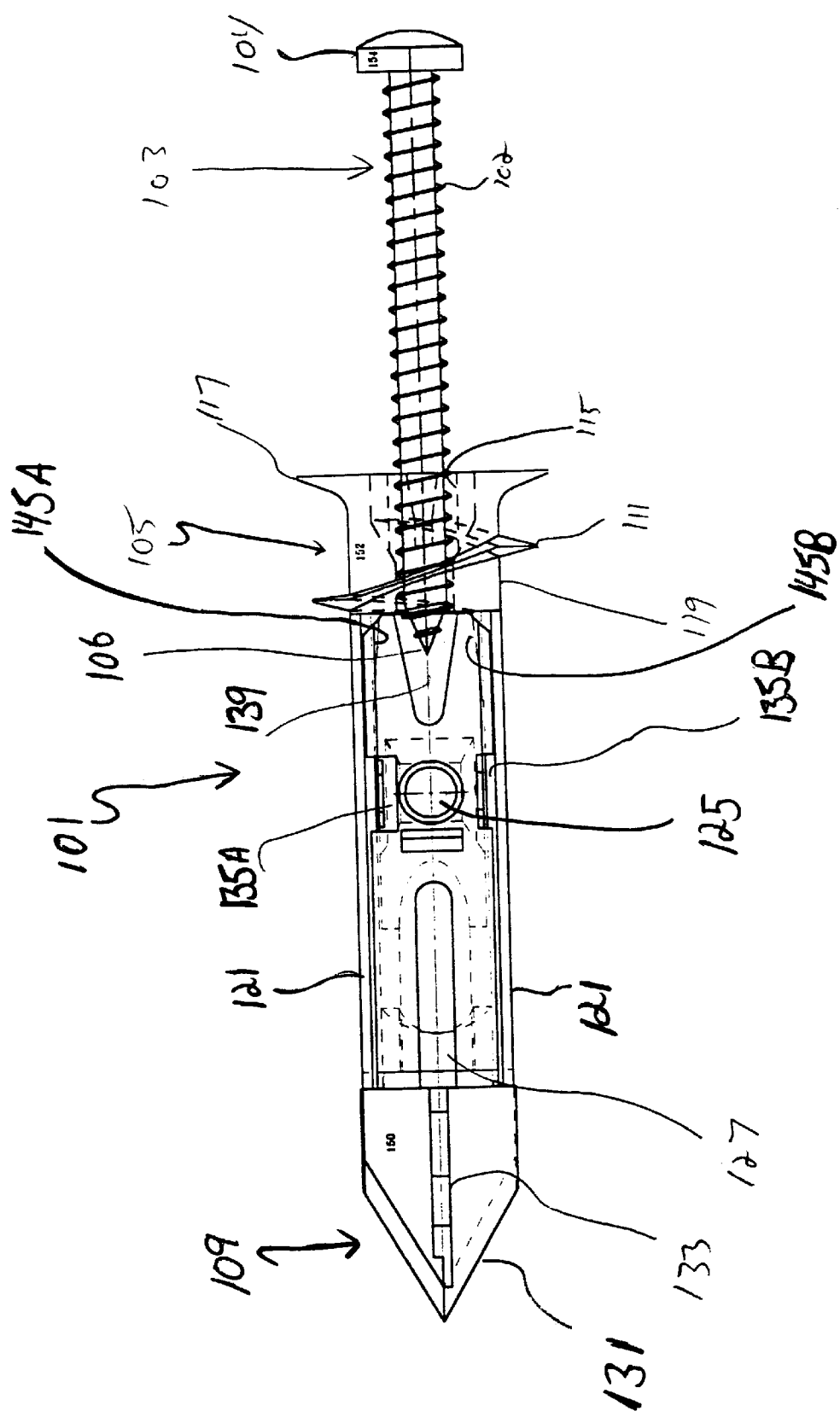

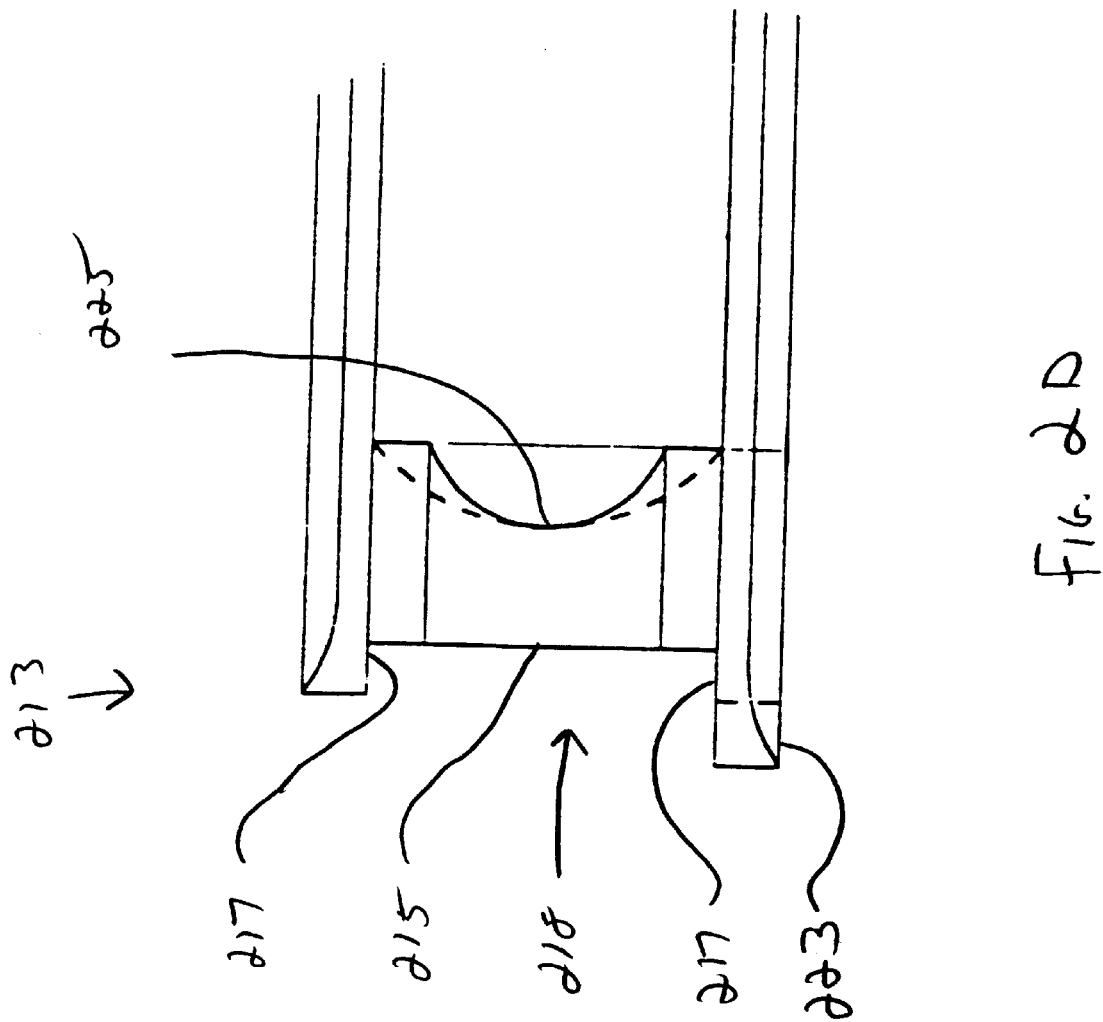

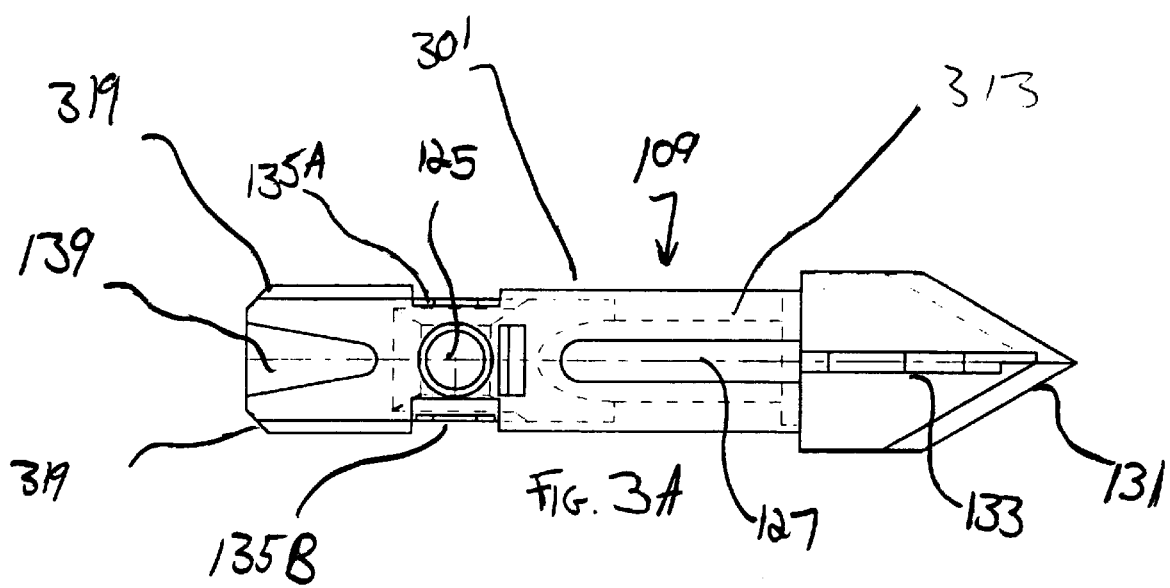

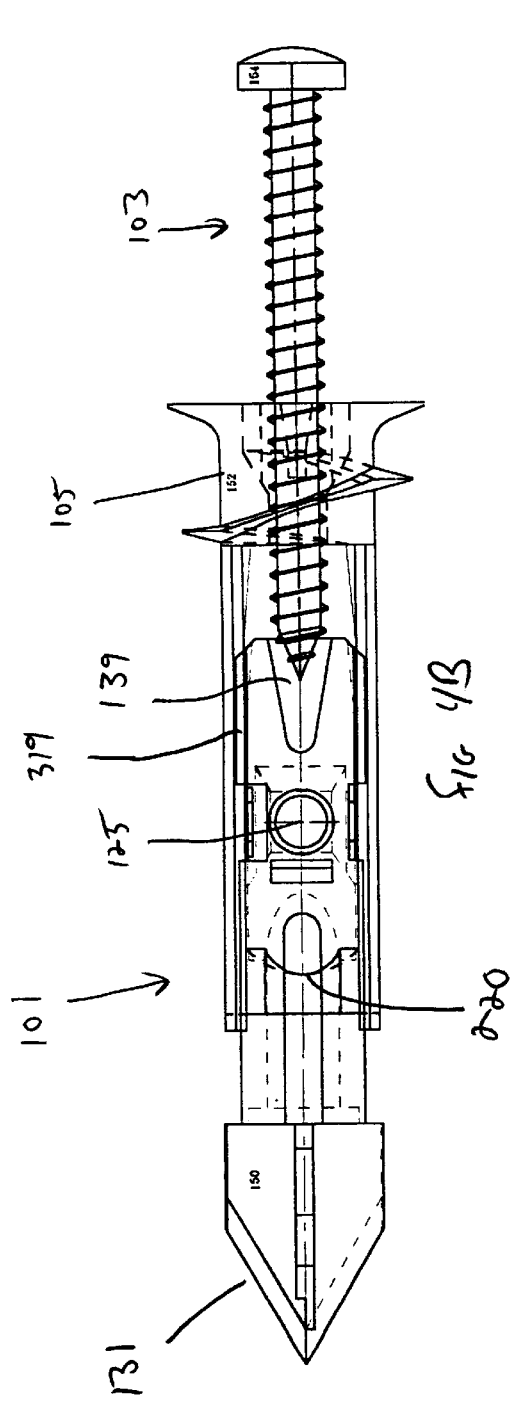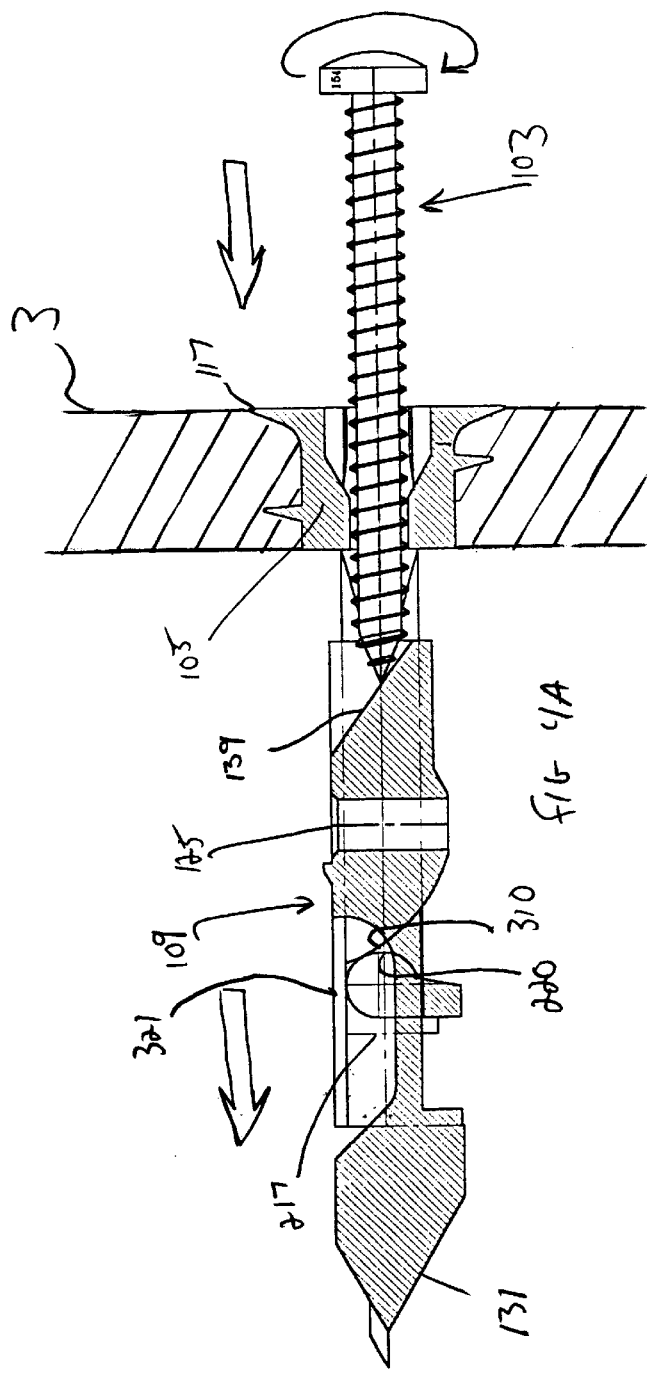

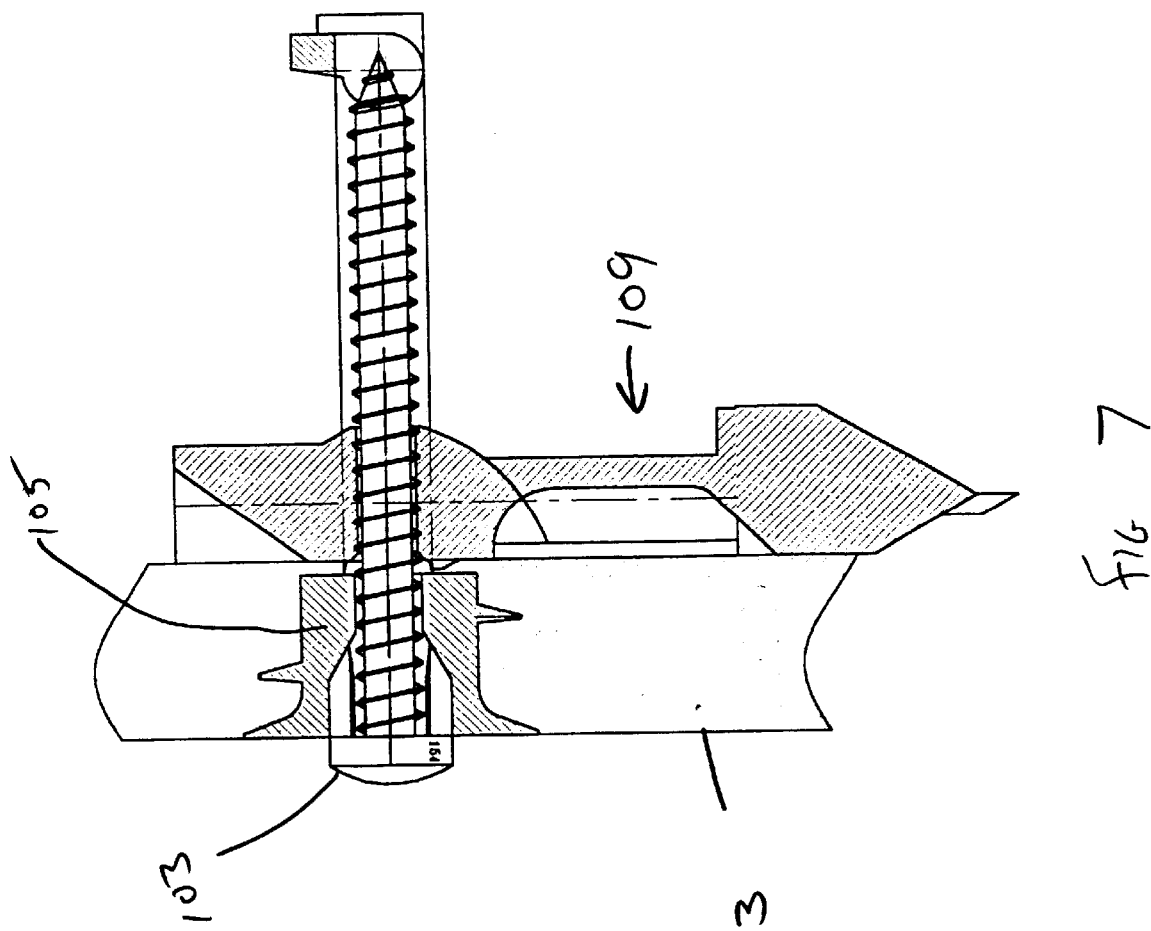

SELF DRILLING SWIVEL TOGGLE ANCHOR

BACKGROUND THE INVENTION

The present invention generally relates to toggle anchors for securing hardware to walls, and specifically to toggle anchors that have threaded anchor members and a lockable self drilling swivel toggle member.

Securing hardware to walls that have hollow spaces presents a particularly difficult problem to solve. Typically, a nail or screw will not hold fast in plaster, gypsum, thin plywood, metal siding or other such materials that are not backed up by a solid reinforcing member such as a stud, joist, or the like. The traditional prior art approach to this problem has resulted in the well-known toggle anchor or toggle bolt. The standard toggle anchor typically consists of numerous parts including a body portion having a retainer bar pivotally attached to its inner end, usually articulated and pivotable about a hinge, and kept in an open axial position by a spring bias. In addition, a nut and bolt combination is provided as a central axis about which the hinged toggle portion suspends. In use, a hole is first drilled through the wall to which the anchor is to be secured. The anchor is then folded up (against its spring bias and about its hinge), positioned into the hole, and moved inward until the retaining bar is through the wall and disposed in the open space behind the wall so that the anchor then springs open and pivots into a securing position. An example of this type of toggle bolt is described in U.S. Pat. No. 5,702,218, which is hereby incorporated by reference in its entirety.

Another prior art toggle anchor is disclosed in U.S. Pat. No. 5,716,179, which is hereby incorporated by reference. The toggle anchor described in U.S. Pat. No. 5,716,179 includes an elongated cylindrical tube having a channel and a spring loaded threaded ball for receiving a bolt. Once the tube is placed through the wall the spring acts to rotate the tube parallel to the blind side surface of the wall. However, the device is not self drilling and a hole must first be drilled before the toggle anchor is placed in the wall.

The above-mentioned traditional types of anchors have been replaced by self drilling single unit toggle anchors that include an anchor member and a swiveling toggle member mounted to the anchor member allowing the toggle member to slide and pivot. Toggle anchors of this type have a reduced number of mechanical parts and are thus easier to manufacture and use in general. The toggle member is securable in a parallel position relative to the anchor member and has a self drilling distal end. When the unit is placed upon the room side surface of a sheet rock wall and a torque is applied, the self drilling distal end burrows through the sheet rock and creates a hole just large enough for the toggle anchor to slide through. The anchor member is formed with a threaded head portion that is larger in diameter than the toggle portion and hence larger than the hole drilled in the wall. As a result when the threaded head portion of the anchor member engages the surface of the wall and a torque is again applied, the threads of the threaded portion burrow into the surface of the wall outside the circumference of the previously drilled hole. The anchor member is formed with a counter sunk flat head that seats the anchor member in the wall securely and prevents complete burrowing of the anchor member.

When the anchor member is securely seated in the wall a self tapping screw is driven through a bore in the center of the anchor member. As the screw advances through the bore the leading edge of the screw engages the toggle member and displaces it from its secured position relative to the anchor portion. Typically, toggle members are counter balanced and once displaced from the anchor member a weighted end of the toggle member will pivot, under the influence of gravity, to a position parallel with the blind side of the wall and orthogonal to the anchor. The toggle member is formed with a bore that becomes co-linear with the screw when the toggle member is parallel with the blind side of the wall. As the screw continues to advance the leading edge enters the bore of the toggle member and the toggle member then is transposed towards the blind side of the Wall along the length of the screw to a position abutting the blind side of the wall and securing the toggle anchor thereto.

Self drilling toggle anchors of the single unit type suffer from several disadvantages. It is important to evenly distribute the torque applied to the anchor member, via a screwdriver, throughout the toggle anchor in order to efficiently burrow through a wall. Because the toggle member of the above described anchor has two degrees of motion relative to the anchor member, i.e., it slides and pivots or swivels relative to the anchor member, a torque applied to the anchor member tends to be distributed unevenly throughout the toggle anchor. This can create undesirable shear forces between contact points of the anchor member and the toggle member which can cause the toggle anchor to burrow offline from the intended target area, misalign the seating of the toggle anchor, and possibly separate the toggle member from the anchor member. A typical solution to the shear force problem is to manufacture the toggle anchors from stronger materials such as metal. However, in order to keep the manufacturing simple and inexpensive it is desirable to forgo the use of metal for plastics and still maintain high structural integrity within the toggle anchor.

SUMMARY OF THE INVENTION

It is therefore an object of the present invention to provide a toggle that distributes a torque load evenly across the entire toggle anchor. It is also an object of the present invention to provide a toggle anchor that can be manufactured inexpensively while maintaining high structural integrity. It is an additional object of the present invention to provide such a toggle anchor made substantially or entirely of plastic.

Another object of the present invention is to provide a toggle design that significantly reduces the endwise profile so that a smaller hole can be drilled relative to the diameter of the anchor member. Still another object of the invention is to reduce the number of mechanical parts needed to fabricate a toggle anchor. Again, an object of this invention is to provide such a toggle anchor made essentially or entirely of plastic.

These and other objects of the invention are met by providing a toggle anchor for securely anchoring hardware to the surface of a wall, featuring an anchor member having a bore and a channel and a self drilling toggle member slidably disposed within the channel and aligned with the axis of the bore. The toggle member is lockable in a first position to facilitate distributing a torque applied to the anchor member to a cutting member drilling or burrowing through a sheet rock wall until the anchor member is securely seated within the wall. The toggle member is displaced in a direction parallel to the longitudinal axis of the anchor member and then pivoted to a second position orthogonal thereto. The toggle member is formed with a bore that becomes co-linear with the longitudinal axis of the anchor member when the toggle member is positioned in orthogonal relation thereto. As a screw advances through the bore of the anchor member, a leading edge thereof engages the bore of the toggle member and transposes the toggle member along the length of the screw until the toggle member abuts and is secured against the blind side surface of the wall. These and other objects, features, and advantages will be more completely set forth in the following sections.

In brief, then, the present invention is a self drilling toggle anchor comprising an anchor member featuring a head portion, a locking portion, and a central portion defining and bordering a channel disposed between the head portion and locking portion, for securely anchoring hardware to a wall with a hollow portion. The head portion of the anchor member features external threads and a counter sunk flat head support lip. The toggle anchor also comprises a toggle member having a body disposed within the channel of the anchor member and a drilling portion for drilling through the wall with a hollow portion. The body of the toggle member is slidably mounted to the anchor member within the channel allowing the toggle member to be movable from a first locked and fixed position parallel to a longitudinal axis of the channel to a second position orthogonal to the longitudinal axis of the channel. The body also includes upper and lower pairs of shoulders that support and contain the body within the channel.

The toggle member is releasably lockable in the first position to the anchor member to provide even distribution of a torque applied to the anchor member along the length of the device. The locking portion of the anchor member features a rim recessed from the distal end of the anchor member and support projections extending from the distal end of the anchor member. The rim and the support projections define and border a locking groove which receives and locks the toggle member in the first position. The toggle member is provided with a fitting portion that is adapted to frictionally engage the locking groove and secure the toggle member in linear engagement with the anchor member. The toggle member is also provided with tracks that receive ribs located on the inner surface of central portions of the anchor member and protrude into the channel. As torque is applied to the head portion of the anchor member, via a screwdriver, the torque is evenly distributed to the working end of the device, i.e., the self drilling end which is provided with a plurality of drilling blades or any conventional device for efficient drilling. In essence, a combination of the interaction of the upper and lower pairs of shoulders supporting and containing the body, the locking portion of the anchor member and the fitting portion of the toggle member, and the ribs of the anchor member and the tracks of the toggle member ensures that the torque is distributed evenly throughout the toggle anchor while drilling through a sheet rock wall having a hollow chamber.

As used herein, reference to a wall or a sheetrock wall is understood to be a wall having a frame with defined spaces between actual sheets of material covering the frame, whether they be sheetrock or paneling. The frame may be formed from any suitable material such as wood or aluminum.

After the drilling blades burrow completely through the sheet rock wall, the head portion, having external threads and a counter sunk flat head support lip thereon, becomes anchored in the room side surface of the wall. The head portion is formed with a bore through which a screw or bolt is passed in order to provide a strong cantilever for supporting hardware. The toggle anchor is designed to be used with a threaded bolt or screw. As the screw is passed through the bore of the anchor its leading edge engages, displaces, and transposes the toggle anchor from the anchor member from the first locked position to a second position orthogonal relative to the anchor member. The toggle member is formed with a bore that becomes co-linear with the longitudinal axis of the anchor member when the toggle member is positioned in orthogonal relation thereto. As a screw advances through the bore of the anchor member, the leading edge engages the bore of the toggle member and transposes the toggle member along the length of the screw until the toggle member abuts and is secured against the surface of blind side of the wall.

A more complete understanding of the features and advantages of the present invention will be realized when taken in conjunction with the following description of the drawings, description of the specific embodiments and the appended claims.

BRIEF DESCRIPTION OF THE DRAWINGS

FIG. 1 is a top elevation in partial cutaway, showing the toggle anchor of the present invention, with a screw partially inserted into the toggle.

FIG. 2D is a side view of the distal end of anchor member of the present invention showing another embodiment thereof.

FIG. 3A is a top elevation of the present invention, showing the toggle member thereof with hidden features in broken lines.

FIG. 4A is a side elevation in partial cutaway, showing the present invention, with a bolt partially inserted into the head portion of the anchor member, and the toggle member partially displaced from the anchor member in a line parallel to the longitudinal axis thereof.

FIG. 4B is a top elevation of the view in FIG. 4A with hidden features in broken lines.

FIG. 7 is a side elevation in partial cutaway, showing the present invention with the toggle member securely abutting the blind side surface of the wall.

DETAILED DESCRIPTION OF THE SPECIFIC EMBODIMENTS

Figure 2A:
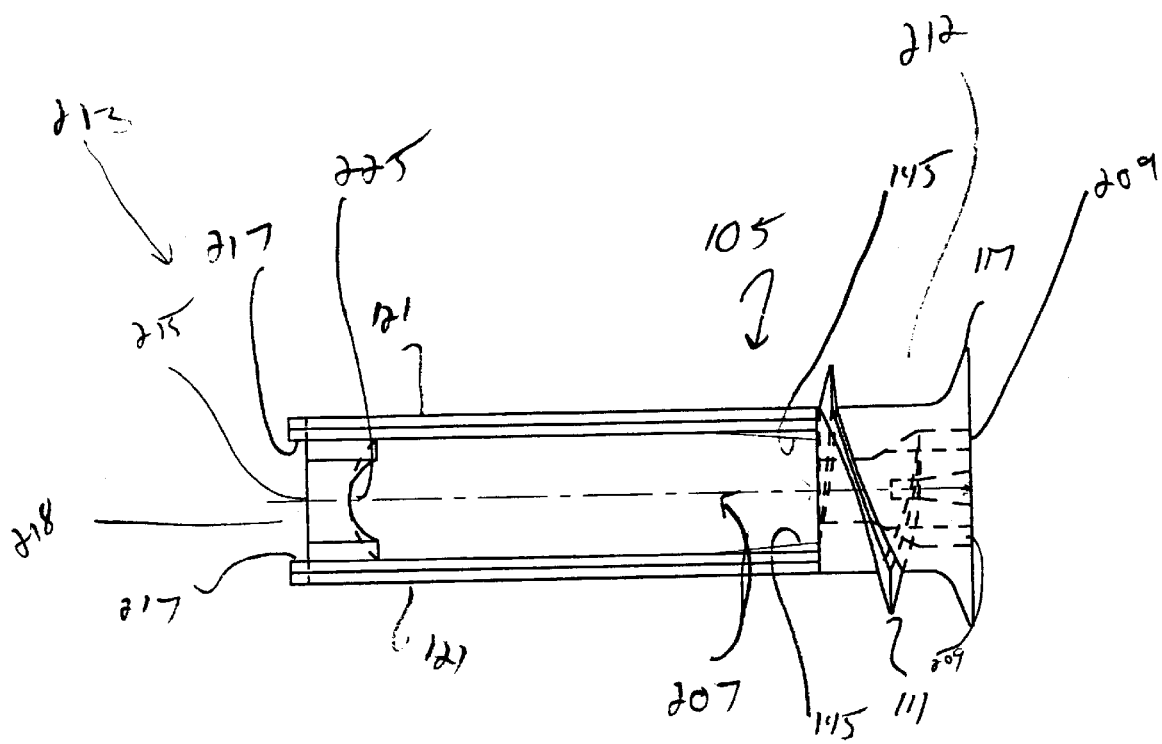
FIG. 2A is a top elevation of the present invention showing the anchor member thereof with hidden features in broken lines.

Referring initially to FIGS. 1, 2A, 2B, and 2C, there is shown a toggle anchor generally at 101 having an anchor member 105 and a self drilling toggle member 109. Anchor member 105 includes head portion 212 at a proximal end and at a distal end a locking portion 213.

Head portion 212 is cylindrycal and comprises external threads 111 and a counter sunk support lip 117. Support lip 117 may be the shape of any conventional driving head or recess, e.g. hex, flat head, phillips, driver, etc. Bore 205 extends through head portion 212 along the longitudinal axis thereof and is adapted to receive a self tapping threaded screw or bolt 103.

As shown in FIG. 1, screw 103 is partially transposed into bore 205. Walls 115 of bore 205 are engaged by threads 102 of screw 103. Diametrically opposed slots 209 are counter sunk in walls 115 surrounding bore 205. Slots 209 are adapted to receive the working end of a driver, as such as flat head screwdriver (not shown). It is understood that any conventional method of driving the toggle anchor into a seated position in the wall may be applied.

Figure 2B:
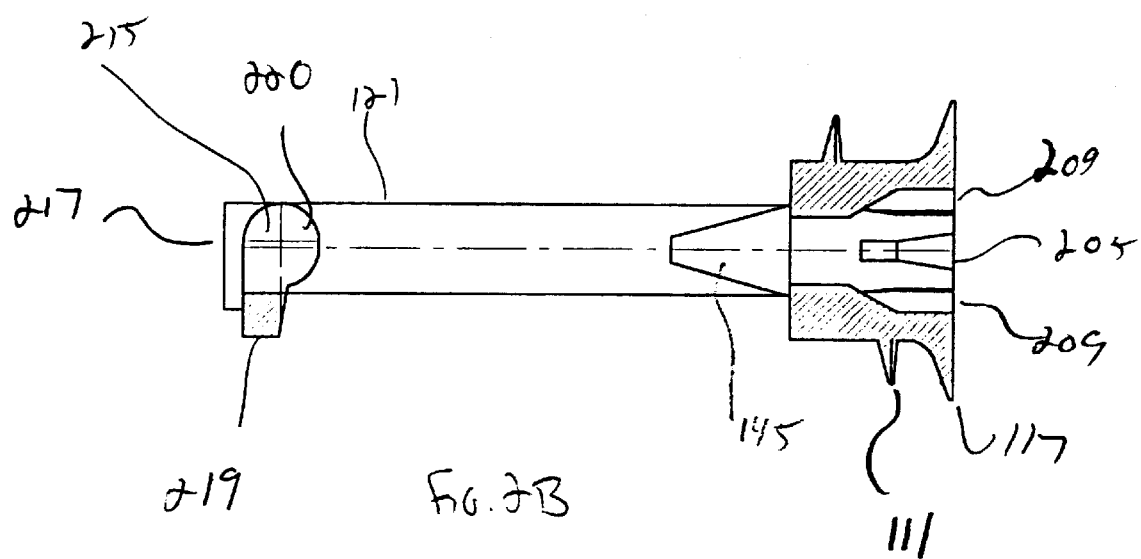
FIG. 2B is a side elevation in partial cutaway, showing the anchor member of the present invention.
Figure 2C:
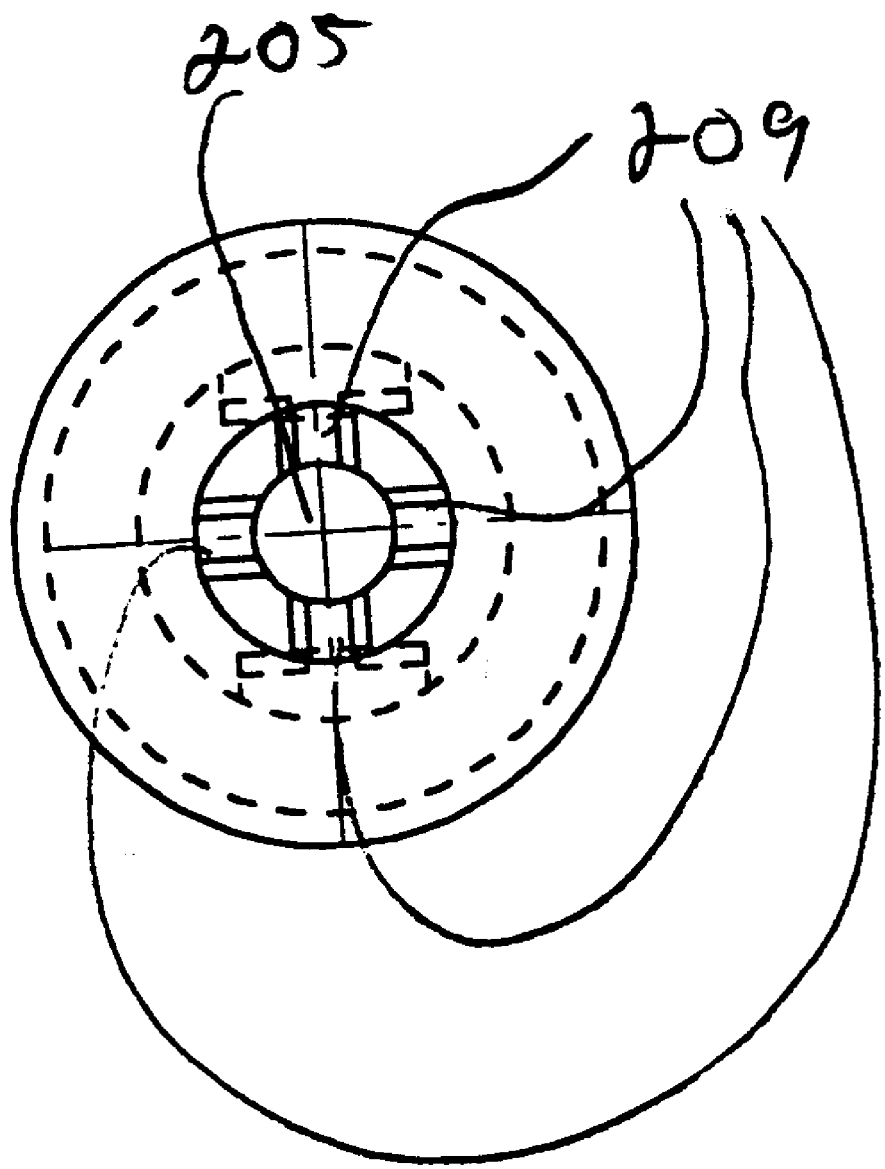
FIG. 2C is a head in view along the longitudinal axis of the anchor member of the present invention.

Referring to FIGS. 2A and 2B, central portions 121 can be seen extending the length of anchor member 105 from head portion 212 to locking portion 213 at the distal end and parallel to the longitudinal axis of head portion 212. Central portions 121 define and border a central channel 207. Ribs 145 are positioned on the interior of central portions 121, abut the base of head portion 212, and extend partly into central channel 207 parallel to its longitudinal axis.

Locking portion 213 located at the distal end can include locking member 215 having a rim 225 recessed from the end of central portions 121. One or more support projections 217 extend from the distal end of anchor member 105 and define groove 218. Support arch 219 is aligned approximately concentrically with rim 225, having a longitudinal axis parallel to the longitudinal axis of head portion 212 and channel 207. Curved surfaces 220 slope away from the distal end and are adjacent to and border channel 207.

Figure 3B:
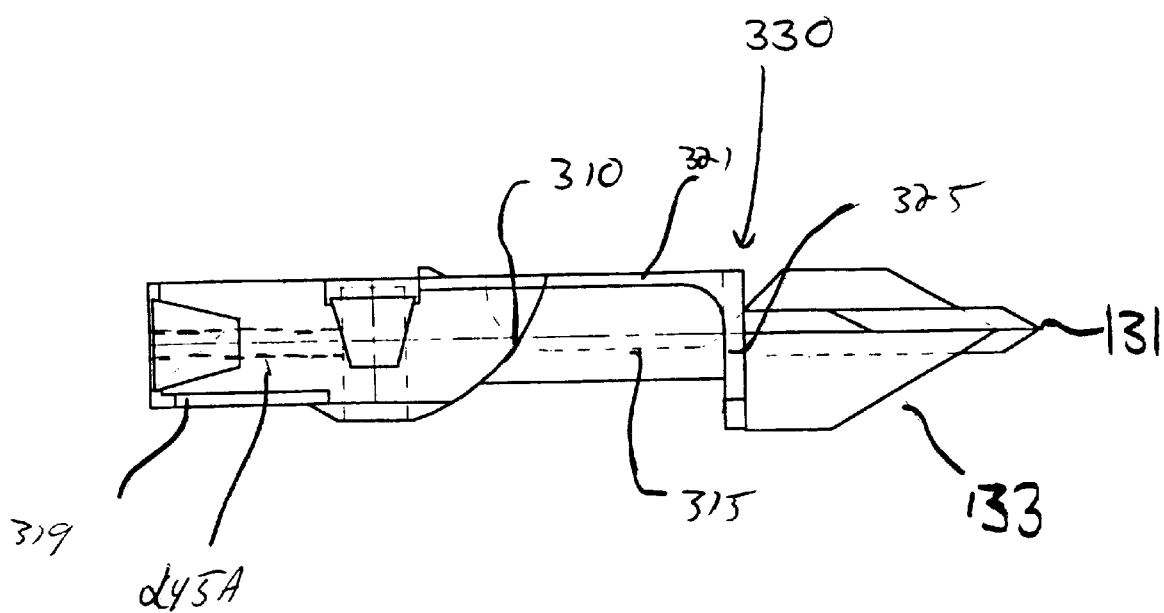
FIG. 3B is a side elevation of the present invention, showing the toggle member thereof with hidden features in broken lines.

Referring to FIGS. 3A and 3B, shown is self drilling toggle member 109 which includes body 301 and drilling member 131. The drilling member can include a plurality of drilling blades 133 or any conventional drilling device adapted to engage the surface of a sheetrock wall. Upon rotation of blades 133 toggle anchor 101 burrows through wall 3. While this invention is described with reference to a plastic toggle anchor used in sheetrock, the drilling blades may be metal for engaging wood paneling or the like.

Body 301 includes a beveled slot 139 disposed on the distal end opposite drilling member 131. Slot 139 is sloped and extends from an orthogonal face on the distal end of toggle member 109 and terminates on the bottom surface of toggle member 109. An upper set of shoulders 319 are disposed parallel and adjacent to the top surface of toggle member 109. Bore 125 extends from the top surface to the bottom surface of toggle member 109. Shoulders 319 extend from the orthogonal face on the distal end of toggle member 109 and terminate near bore 125. Body 301 also includes sloped portion 310 sloping from the top surface of toggle member 109 and terminating at an arcuate sleeve 315. Arcuate sleeve 315 extends the length of body 301 and abuts drilling member 131 where upright wall 325 of fitting portion 330 forms a border therewith. The base of arcuate sleeve 315 includes a lower pair of shoulders 321 which are positioned parallel with and adjacent to the bottom surface of toggle member 109 and extend from upright wall 325 and terminate near bore 125.

Shown in FIG. 3A are orthogonal tracks 135A and 135B disposed on the exterior surfaces of body 301 which run parallel to and are aligned with bore 125 from the top surface to the bottom surface of toggle member 109. Parallel tracks 245A and 245B run on the exterior surfaces of body 301 orthogonal to bore 125 from the distal end of body 301 and terminate near the intersection with orthogonal tracks 135A and 135B, respectively.

Body 301 is adapted to slidably engage and conform to the borders of channel 207 of the anchor member 105. Body 301 slides from a first position parallel to the longitudinal axis of bore 205 to a second position orthogonal to the longitudinal axis of bore 205. Shoulders 319 and 321 are formed to slidably engage the outer extremities of central portions 121. Upper and lower shoulders 319 and 321 support body 301 and contain it within channel 207. As body 301 transposes from the first position to the second position, shoulders 319 and 321 guide and support body 301 as it slides and pivots relative to central portions 121.

In the first position, body 301 is locked within channel 207. Locking member 215 is disposed about arcuate sleeve 315 with rim 225 and support arches 219 abutting the upper surface thereof Upright wall 325 of fitting portion 330 is received into groove 218 and frictionally engages support projections 217 releasably locking toggle member 212 in parallel relation with anchor member 105. It is understood that fitting portion 330 can be adapted to seat in groove 218 without being frictionally engaged. It is also possible that the connection between fitting portion 330 and locking member 215 can be a snap fitting, where upright wall 325 is dimensioned slightly larger that the space provided in groove 218 by projections 217. With a slight force applied fitting portion 330 will deform slightly upon placement into locking member 215 so that the elements will "snap" upon contact and a secure connection is provided between toggle member 109 and anchor member 105.

Figure 2E:
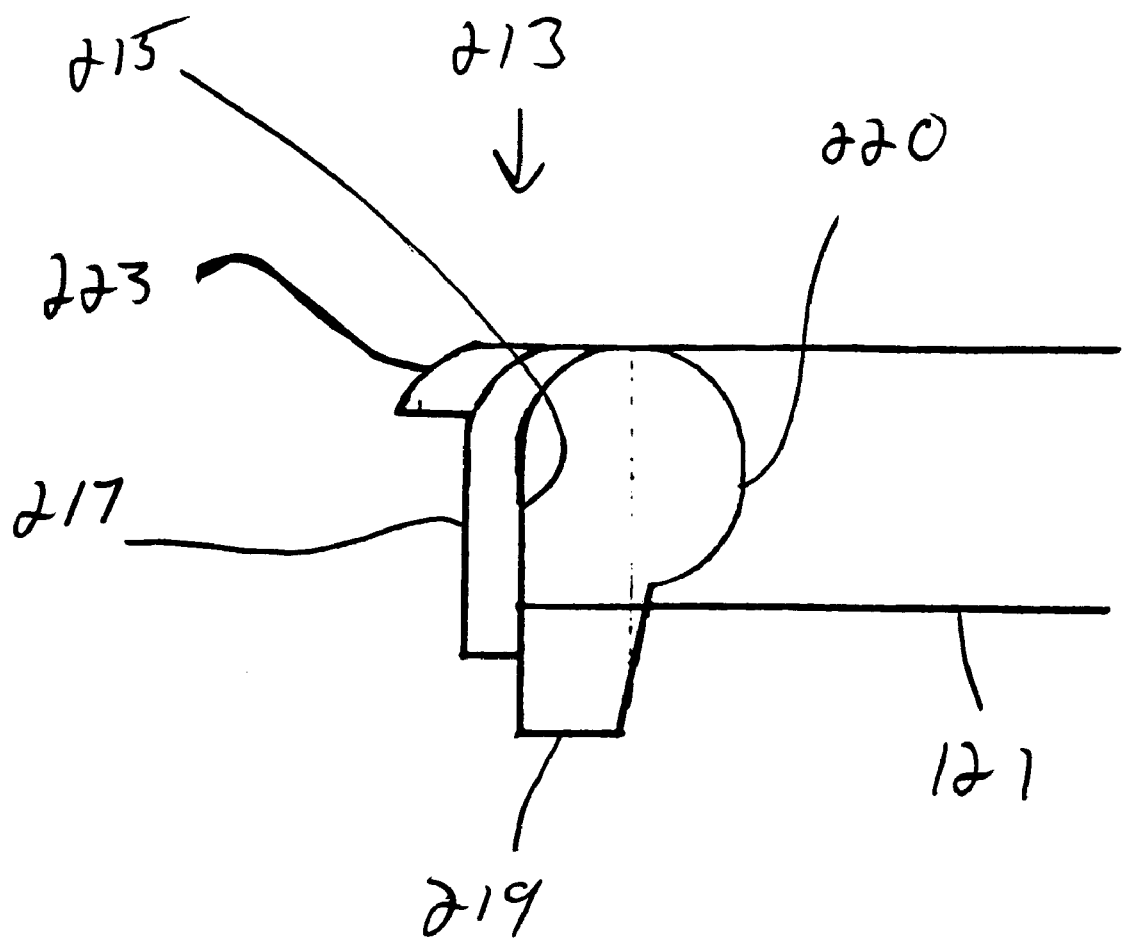
FIG. 2E is a top elevation of the distal end of the anchor member of the present invention showing another embodiment thereof with hidden features in broken lines.

In FIG. 2D and 2E, there is shown another embodiment of locking member 215 with a "snap" fitting. In FIG. 2D it can be seen that at least one projection 217 includes flange 223 thereon. Flange 223 extends past upright wall 325 of fitting portion 330 and frictionally engages the side thereof. When toggle member 109 is placed in parallel relation to anchor member 105 flange 223 engages the side of upright wall 325. Although flange 223 is rigidly formed, it can flex upon the application of stress due contact between flange 223 and upright wall 325. As toggle member 109 and anchor member 105 are compressed, flange 223 flexes and passes to the side of upright wall 325 allowing upright wall 325 to abut projections 217 and rim 225. As flange 223 and the side of upright wall 325 slide past each other, a "snap" can be heard as the surfaces of upright wall 325 contact the surfaces of projections 217 and rim 225. Because flange 223 is rigidly formed it will grasp the side of upright wall 325 and provide additional support to toggle anchor 101 during the application of torque.

The top and bottom surfaces of body 301 of toggle member 109, when locked in the first position, provide a profile that at its maximum preferably coincides with the profile of drilling blades 133. The distal end of body 301 abuts anchor portion 205 on exit side of bore 205 and tracks 245A and 245B receive ribs 145A and 145B, respectively, which prevent rotation of body 301. Slot 139 on body 301 is adjacent anchor portion 205 on exit side of bore 205.

When the working end of a flat head screwdriver (not shown), or other driving device, is received into slots 209 and blades 133 of self drilling toggle member 109 are placed upon a wall along its normal line, the torque applied to the anchor member via the screwdriver is distributed evenly throughout toggle anchor 101. This allows efficient engagement of drilling blades 133 with wall 3. In the preferred embodiment the combination of preferably all of: (1) upper and lower shoulders 319 and 321 abutting central portions 121; (2) the snap, frictional, or seating engagement of fitting portion 330 and locking member 215; and (3) the connection between tracks 245A and 245B and ribs 145 help to provide even distribution of torque along the length of the device.

After drilling blades 133 burrow completely through the wall, body 310, enclosed in channel 207 by central portions 121, is transferred through the hole to the blind side of the wall until threaded head portion 212 of anchor member 109 is abutting the wall. As torque is again applied to the slots 209 via the screwdriver, threads 111 engage the wall and burrow therethrough. When threaded head portion 212 is completely sunk into the wall support lip 117 abuts the wall outside the circumference of the hole. As such, anchor member 105 is prevented from burrowing completely through and is permanently and securely affixed to the wall.

Referring to FIGS. 4A and 4B, with anchor member 105 secured in wall 3, self drilling screw 103 is passed through bore 205. The diameter of bore 205 may be larger than that of the screw 103, however, preferably self drilling screw engages walls 115 of bore 205 so threads 102 spiral through walls 115 of bore 205. This provides support for screw 103 as it advances through bore 205. As the leading edge of screw 103 exits bore 205 it comes into contact with slot 139 on body 301 located adjacent to the exit side of bore 205. As screw 103 engages the sloped surface of slot 139, toggle member 109 disengages from the locked first position moving along a line parallel to the longitudinal axis of channel 207 along tracks 245A and 245B. As screw 103 continues to advance further through bore 205, the leading edge of screw 103 slides and pushes toggle member along a line parallel to the longitudinal axis of channel 207 until the sloped portion 310 of body 301 contacts curved surfaces 220. Advancement of toggle member 109 along a line parallel to the longitudinal axis of channel 207 is prevented and as the leading edge of screw 103 advances along the sloped surface of slot 139, toggle member 109 rotates, guided by surface 220 to the second position orthogonal the longitudinal axis of channel 207.

Figure 5A:
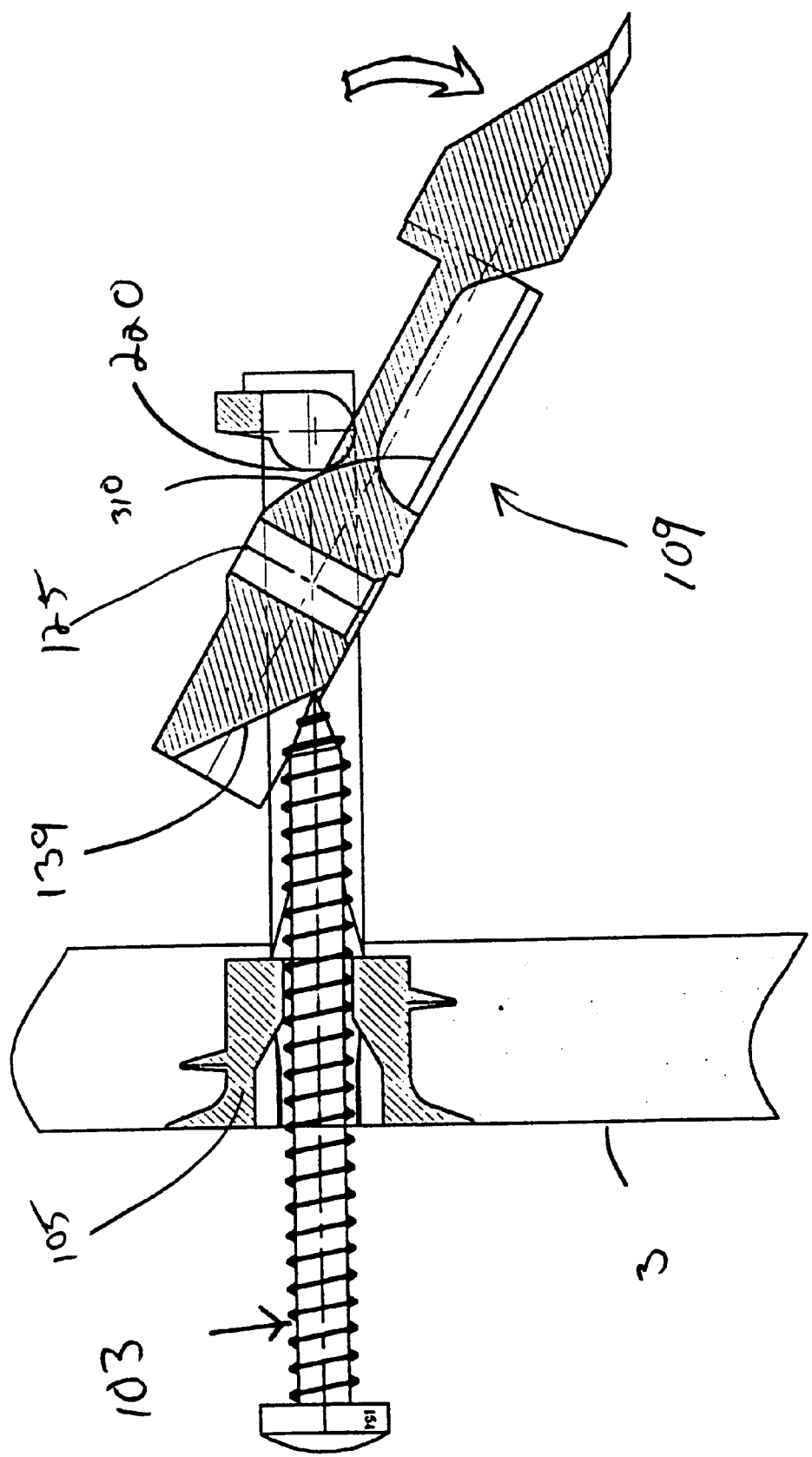
FIG. 5A is a side elevation in cutaway of the view in FIG. 5.
Figure 5:
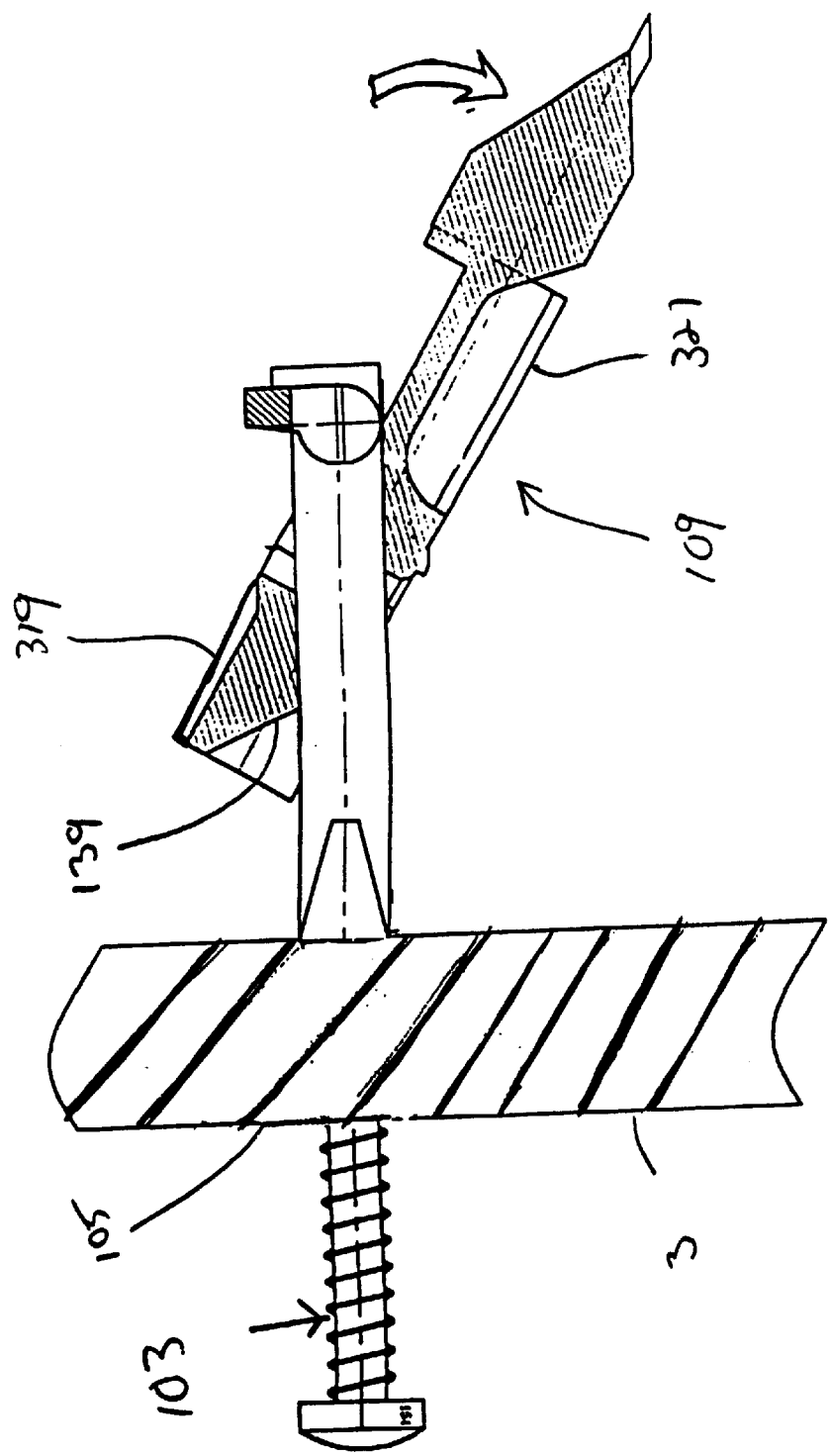
FIG. 5 is a side elevation in partial cutaway of the toggle member of the present invention, showing the toggle member being displaced by a screw advancing through the bore in the anchor member and the toggle member partially pivoted relative to the anchor member.

Referring to FIGS. 5 and 5A, as toggle member 109 rotates, shoulders 319 and shoulders 321 act as guide rails and support toggle member 109 from opposite sides. With support on the top and bottom via shoulders 319 and shoulders 321, as screw 103 advances on the sloped surface of slot 139, toggle member 109 is forced to rotate following the arc of sloped portion 310 in slidable communication with curved surfaces 220.

Figure 6:
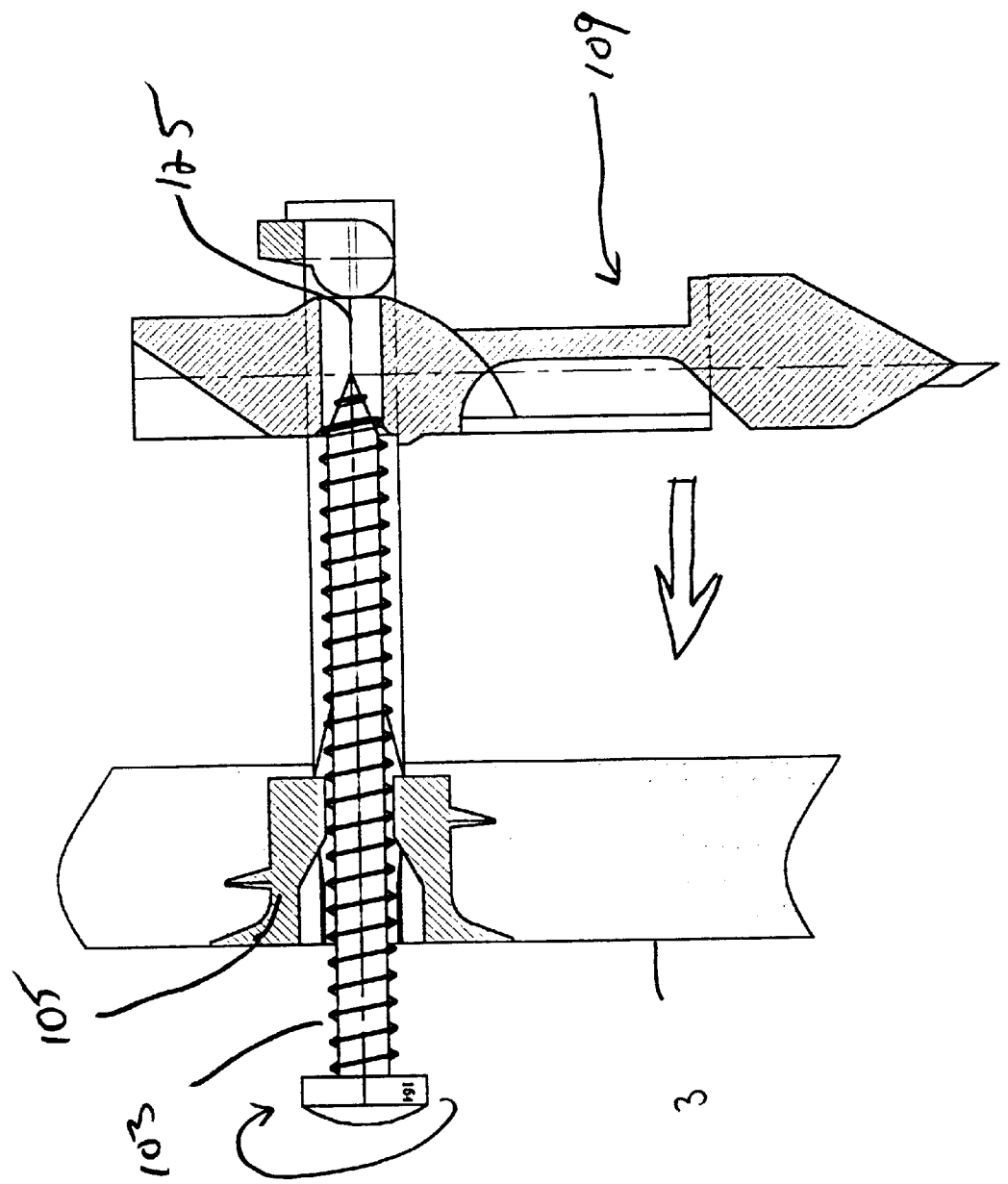
FIG. 6 is a side elevation in partial cutaway showing the present invention with the toggle member orthogonal relative to the anchor member.

Referring to FIG. 6, once toggle member 109 is rotated completely to a position orthogonal to the line parallel to the longitudinal axis of channel 207, the edges of shoulders 319 and shoulders 321 provide support for toggle member 109 (not shown) and compel the axis of bore 125 into a co-linear relationship with the axis of channel 207 with the bottom face of body 301 facing the blind side of wall 3. As screw 103 continues to advance through bore 205, the leading edge of screw 103 advances through bore 125. The diameter of bore 125 is preferably smaller than the diameter of screw 103 so that threads 102 may burrow through wall 3 of bore 125. As the screw 103 advances through bore 125, toggle member 109, which is in orthogonal relationship to the blind side of wall 3, is transposed along a line parallel with the longitudinal axis of channel 207 to a position abutting the blind side of wall 3. The bottom face of body 301 of brought into secure abutment with the blind side of wall 3 and toggle fastener 101 is permanently affixed to wall 3 as shown in FIG. 7.

Because many varying and different embodiments may be within the scope of the inventive concept herein taught including equivalent structures or materials and method steps hereinafter thought of, and because many modifications may be made in the embodiments herein detailed in accordance with the descriptive requirements of the law, it is to be understood that the detail herein are to be interpreted as illustrative and not in a limiting sense.

What is claimed is:

1. A self drilling toggle anchor, comprising:

an anchor member having a head portion at a proximal end, a locking portion at a distal end, said locking portion having a support projection at said distal end and extending thereto, and a central portion for securely anchoring, hardware to a wall, said central portion defining and bordering a channel disposed between said head portion and locking portion;

a drilling member positioned at a distal end of said toggle anchor for drilling through said wall; and a toggle member, said toggle member having
a body disposed within said channel of said anchor member,
a fitting portion disposed between said body and said drilling member, and
upper and lower pairs of shoulders supporting said body within said channel, said body slidably mounted to said anchor member within said channel, said fitting portion adapted to frictionally engage said support projection of said locking portion so as to allow said toggle member to be moved from a releasably locked and fixed first position parallel with a central axis of said channel to a second position orthogonal to said channel.

2. The toggle anchor according to claim 1 wherein said drilling member is located at a distal end of said toggle member.

3. The toggle anchor according to claim 2 wherein said head portion comprises external threads and a counter sunk support lip for securely seating said anchor member in the wall.

4. The toggle anchor according to claim 2 wherein said locking portion of said anchor member further comprises a rim recessed from the distal end of said anchor member and support projection extending from the distal end of said anchor member, said rim and said support projections define and border a locking groove adapted to receive and releasably lock said toggle member in said first position.

5. The toggle anchor according to claim 4 wherein said anchor member is made of plastic.

6. The toggle anchor according to claim 5 wherein said toggle member is made of plastic.

7. The toggle anchor according to claim 4 wherein said drilling member includes a plurality of drilling blades for efficiently burrowing through the wall.

8. The toggle anchor according to claim 4 wherein said anchor member further comprises at least two ribs and said toggle member further comprises at least two tracks, each one of said at least two tracks for receiving one of said at least two ribs to provide even distribution of a torque applied to said toggle anchor.

9. The toggle anchor according to claim 4 wherein said fitting portion is receivable in said locking groove releasably locking said toggle member in parallel relation with said anchor member.

10. The toggle anchor according to claim 9 wherein said locking portion further comprises a flange extending from said support projection, said flange adapted to snap fit with an upright wall.

11. The toggle anchor according to claim 9 wherein said fitting portion comprises an upright wall frictionally engaging said support projections and said rim.

12. A self drilling toggle anchor, for securely anchoring hardware to a wall, comprising:

an anchor member having a head portion at a proximal end, a means for locking at a distal end, releasably engaging a toggle member, and a central portion, said central portion defining and bordering a channel disposed between said head portion and locking means;

a drilling member positioned at a distal end of said toggle anchor for drilling through said wall; and said toggle member having
  a body disposed within said channel of said anchor member, a fitting portion disposed between said body and said drilling member, and
  upper and lower pairs of shoulders supporting said body within said channel, said body slidably mounted to said anchor member within said channel, said fitting portion adapted to releasably engage said locking means said toggle member being moveable from a releasably locked and fixed first position parallel with a central axis of said channel to a second position orthogonal to said channel.

\* \* \* \* \*